July 29, 1958 — N. GRUBELIC — 2,844,875
FLUID MEASURING DEVICE
Filed Dec. 9, 1954 — 4 Sheets-Sheet 1
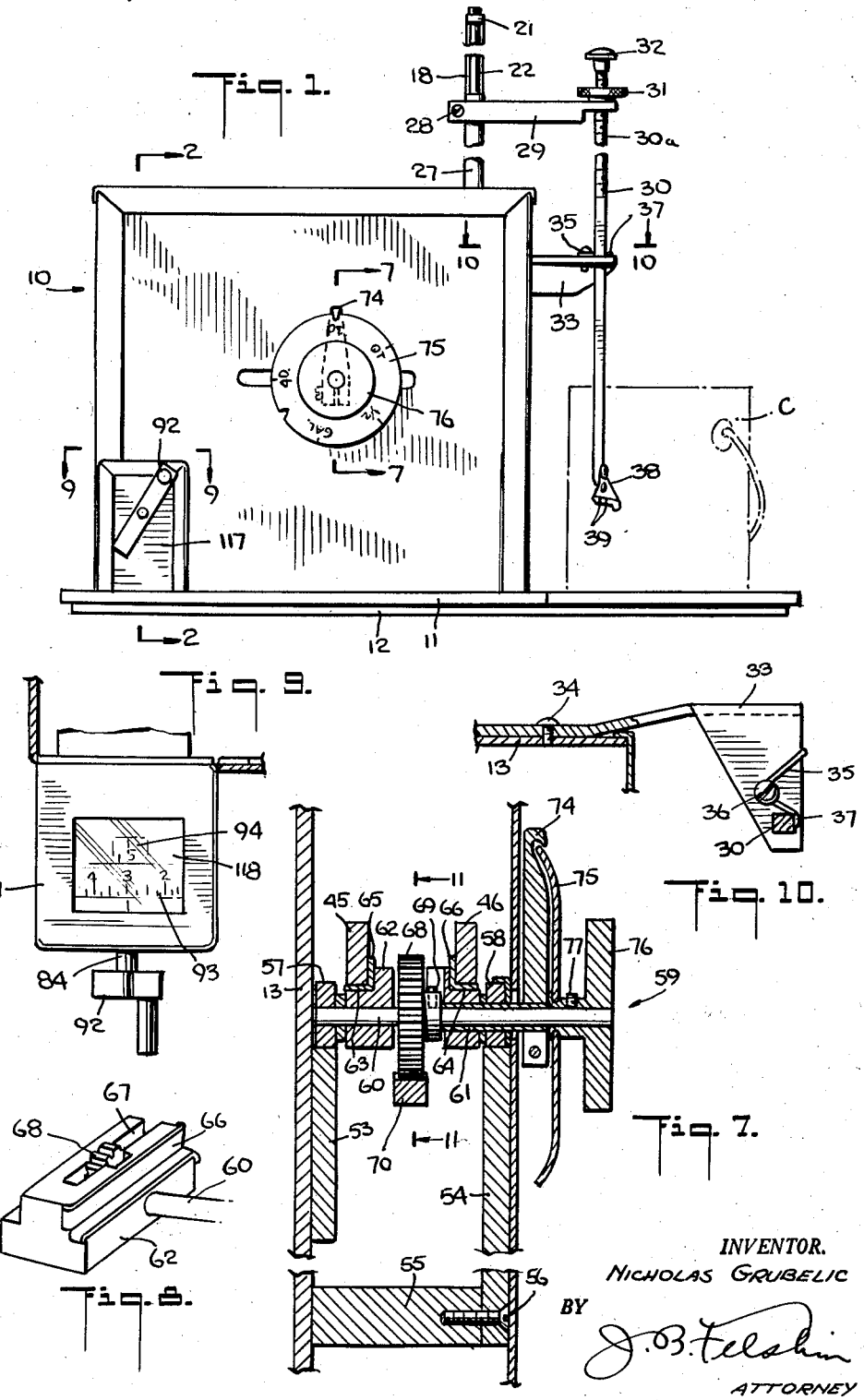
INVENTOR.
NICHOLAS GRUBELIC
BY
ATTORNEY July 29, 1958
N. GRUBELIC
2,844,875
FLUID MEASURING DEVICE
Filed Dec. 9, 1954
4 Sheets-Sheet 2
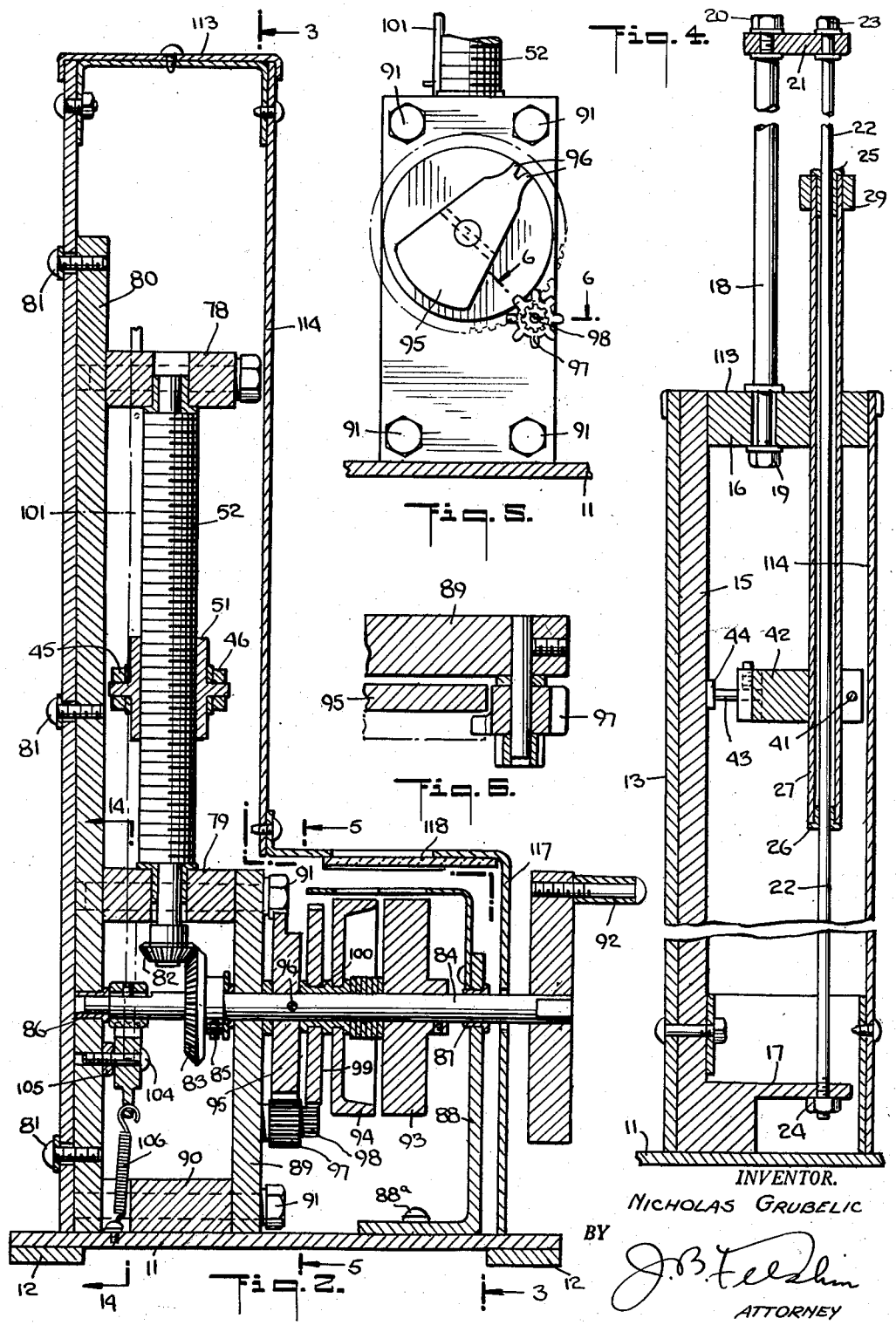
INVENTOR.
NICHOLAS GRUBELIC
BY
J.B. Feldman
ATTORNEY

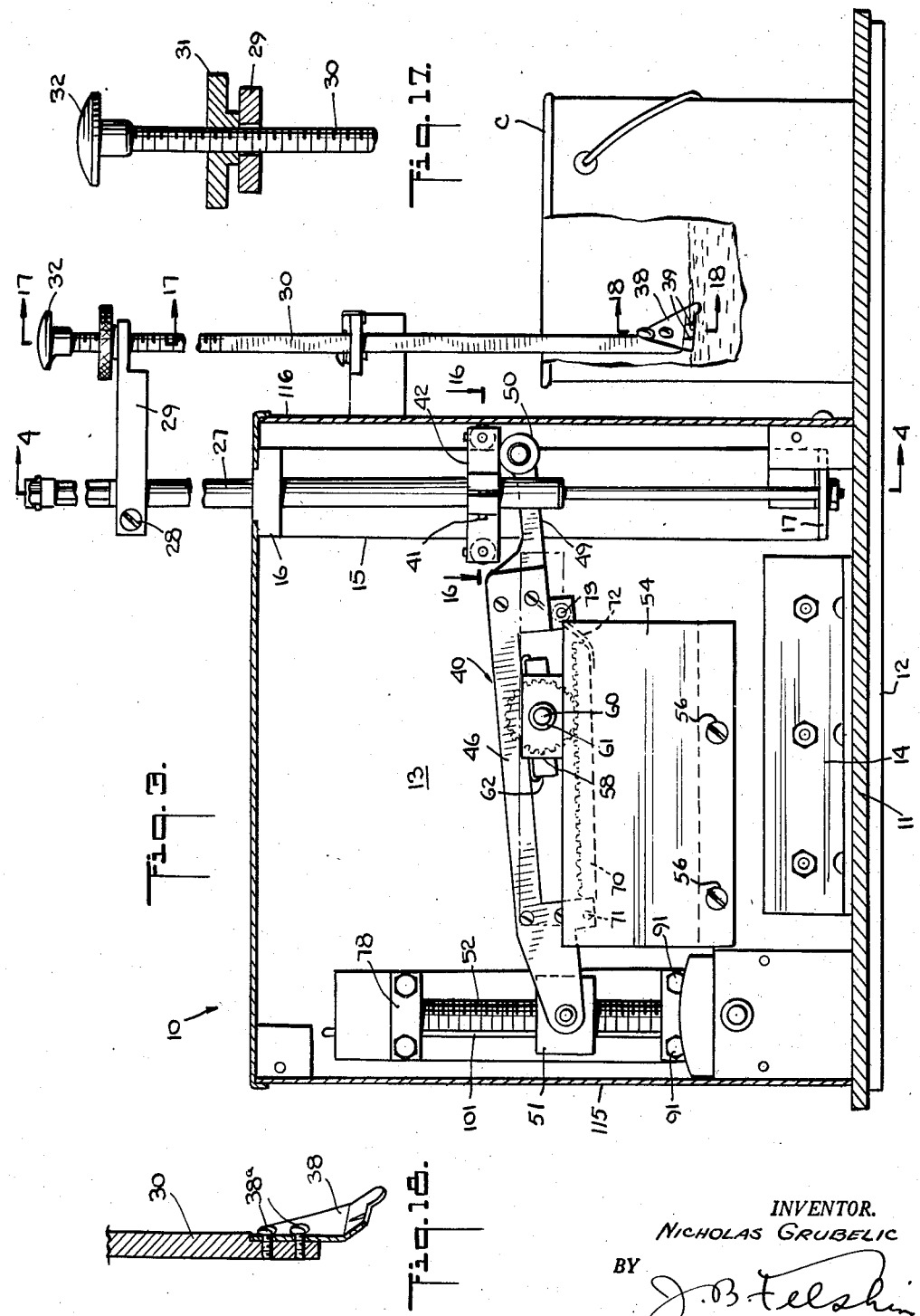

July 29, 1958 N. GRUBELIC 2,844,875
FLUID MEASURING DEVICE
Filed Dec. 9, 1954 4 Sheets-Sheet 4
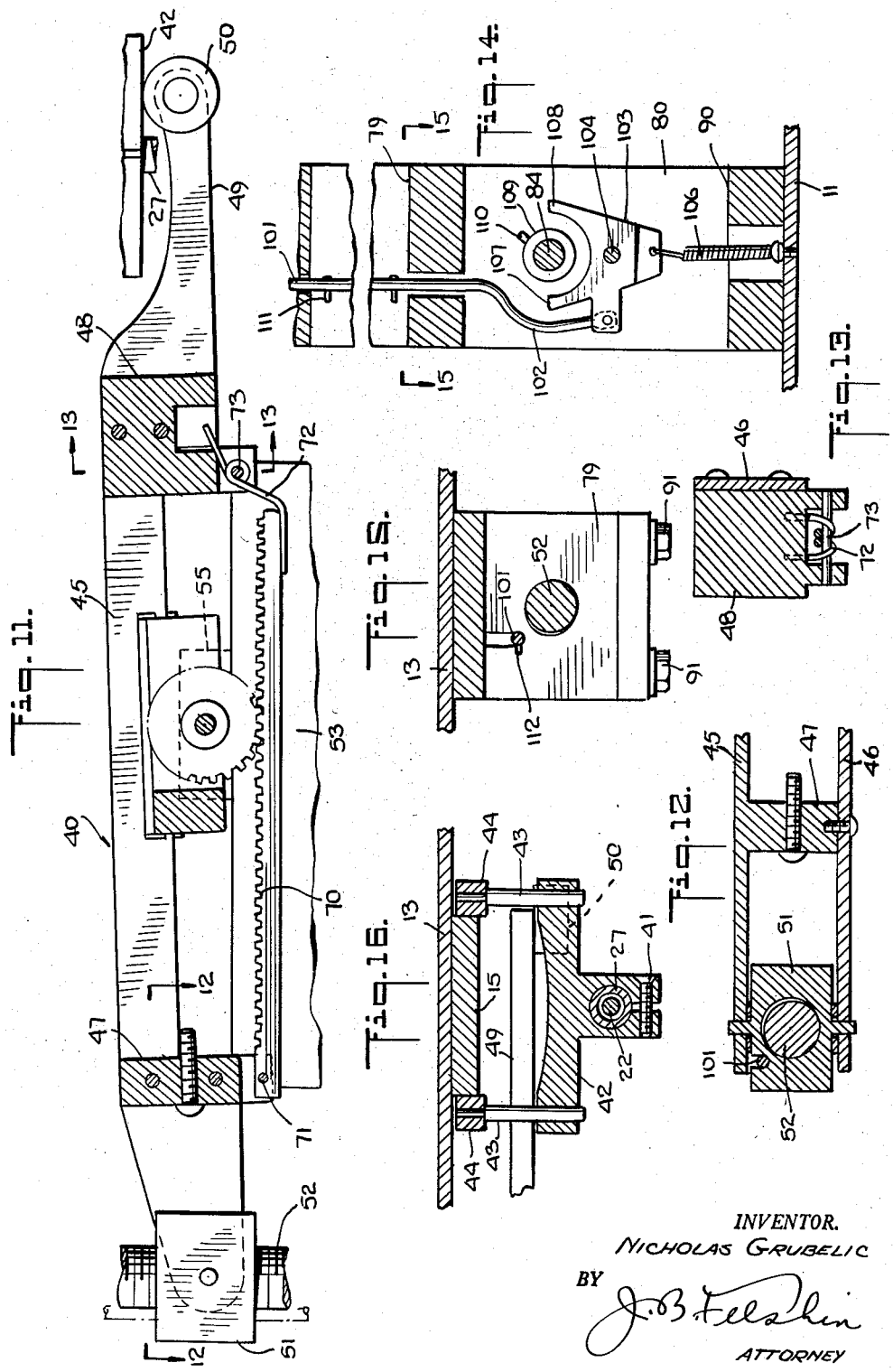
INVENTOR.
NICHOLAS GRUBELIC
BY
J. B. Felshin
ATTORNEY // 2,844,875
// Patented July 29, 1958

United States Patent Office

2,844,875
FLUID MEASURING DEVICE

Nicholas Grubelic, Williston Park, N. Y.

Application December 9, 1954, Serial No. 474,145

17 Claims. (Cl. 33—126.7)

This invention relates to devices for measuring fluids and is directed particularly to a machine for use in preparing paint of a particular color in accordance with formulae of basic color paints.

One object of this invention is to improve upon the devices disclosed in my Patents No 2,563,601 and No. 2,685,135, issued on August 7, 1951, and August 3, 1954, respectively, both entitled Fluid Measuring Device.

Another object of this invention is to provide an improved and simplified machine of the character described for measuring predetermined amounts of different basic color paints for filling various containers for paint, for example a 4 oz. can, a 1 pint can, a 1 qt. can, a ½ gal. can, or a 1 gal. can, with the use of only a single counter or dial and a lever having a movable fulcrum.

Another object of this invention is to provide a measuring device of the above nature having a dial mechanism calibrated from 1 to 200 and operative to be manually actuated in accordance with predetermined formulae to control the angular positions of the lever so as to indicate by means of level height mechanism associated therewith the amounts of the various basic color paints that are to be successively added to any size can for which the lever fulcrum is set in order to provide a full can of the formula paint color desired.

Another object is to provide, in a device of the character described, limit mechanism operative to prevent the dial mechanism from inadvertently being turned too far beyond its upper and lower calibration limits so as to prevent undue strain upon the mechanism interconnecting the dial mechanism and the lever.

A still further object of this invention is to provide a rugged and compact machine of the character described which shall be easy to manipulate, which shall comprise few and simple parts, which shall be relatively inexpensive to manufacture and which shall yet be practical and efficient to a high degree in use.

Other objects of this invention will in part be obvious and in part hereinafter pointed out.

The invention accordingly consists in the features of construction, combination of elements, and arrangement of parts which will be exemplified in the construction hereinafter described, and of which the scope of invention will be indicated in the following claims:

In the accompanying drawings, in which is shown one of the various possible illustrative embodiments of the invention, Fig. 1 is a front elevational view of the machine;

Fig. 2 is a vertical cross-sectional view taken along the line 2—2 of Fig. 1;

Fig. 3 is a vertical cross-sectional view of the device taken along the line 3—3 of Fig. 2;

Fig. 4 is a vertical cross-sectional view of the device taken along the line 4—4 of Fig. 3;

Fig. 5 is a vertical cross-sectional view taken along the line 5—5 of Fig. 4, and illustrates the transfer gearing of the dial mechanism;

Fig. 6 is a cross-sectional view taken along the line 6—6 of Fig. 5;

Fig. 7 is a cross-sectional view taken along the line 7—7 of Fig. 1, and illustrates details of the fulcrum control mechanism;

Fig. 8 is an oblique view showing separately the movable carriage associated with the lever for changing the fulcrum axis;

Fig. 9 is a view taken along the line 9—9 in Fig. 1, and illustrating the top of the calibrated dial mechanism as it appears to the operator;

Fig. 10 is a horizontal cross-sectional view taken along the lines 10—10 of Fig. 1, and shows the supporting bracket for the paint level indicator rod;

Fig. 11 is a vertical cross-sectional view taken along the line 11—11 of Fig. 7 and illustrating the lever and associated mechanism;

Fig. 12 is a horizontal cross-sectional view taken along the line 12—12 of Fig. 11 and illustrates mechanism interconnecting one end of the lever with the dial mechanism for controlling the angular position of the lever;

Fig. 13 is a vertical cross-sectional view taken along the line 13—13 of Fig. 12 and illustrates the resilient means holding the rack against the carriage movement gear for changing the lever fulcrum;

Fig. 14 is a vertical cross-sectional view taken along the line 14—14 in Fig. 2 and shows details of the dial movement limit mechanism;

Fig. 15 is a horizontal cross-sectional view taken along the line 15—15 of Fig. 14;

Fig. 16 is a horizontal cross-sectional view taken along the line 16—16 of Fig. 3 showing the mechanism whereby the position of the outer end of the lever is operative to proportionately vary the height of a sleeve member associated with the paint level indicator rod;

Fig. 17 is a vertical cross-sectional view taken along the line 17—17 of Fig. 3 and shows the adjustment mechanism for adjusting the lever indicator rod to proper initial position prior to start of the mixing operations; and Fig. 18 is a vertical cross-sectional view taken along the line 18—18 of Fig. 3 and shows the level indicator plate at the lower end of the level indicator rod.

Referring now in detail to the drawings, 10 designates a measuring machine embodying the invention. The same comprises a base 11, which may be of aluminum or other suitable material. The base 11 has fixed along its underside a pair of spaced longitudinal feet 12. A vertical supporting plate 13 is mounted upon the base 11 by means of a right angle bracket 14. Against the left-hand inner side of the vertical supporting plate 13 is fixed a vertical support bar 15 having an upper horizontal support member 16 and a lower horizontal support member 17 (see Figs. 3, 4). A support post 18 having threaded ends is secured at one end in an opening in the upper horizontal support member 16 by means of a nut 19. Said support post extends upwardly and has fixed at its uppermost end, by means of nut 20, a horizontal arm 21. A guide rod 22, having threaded ends is secured vertically between the horizontal arm 23 and the lower horizontal support member 17 by upper and lower locking nuts 23 and 24, respectively. Said rod passes through an appropriate opening in the upper horizontal support member 16 and has slidably disposed thereon upper and lower end bushings 25 and 26, respectively, fixed in the ends of a sleeve member 27 circumjacent the rod. A clamp screw 28 serves to lock a horizontal level indicator rod control arm 29 to the upper end of the sleeve member 27. The outer end of the level indicator rod control arm 29 is provided with an opening through which the upper end of a level indicator rod 30 slidably extends. The upper end portion of the level indicator rod 30 is threaded, as indicated at 30a, and has screwed thereon an adjusting thumb-screw 31 having its lower surface resting against the top of the level indicator control arm 29. The upper end of the level indicator rod 30 is provided with a knob 32 for manual lifting of said rod. The lower portion of the level indicator rod 30 is rectangular in cross section and is guided for vertical motion in a rectangular opening in an angular bracket 33 fixed against the vertical supporting plate 13 as by a screw 34 (see Fig. 10).

Friction means for preventing loose sliding of the indicator rod in the bracket 33 is provided, the same comprising a spring 35 supported around a rivet or screw 36 and having an end 37 bearing resiliently against the level indicator rod 30. The lower end of the level indicator rod 30 has fixed thereto as by screws 38a a level indicator plate 38. Said plate has an angular lower edge along which are inscribed a pair of spaced marking lines 39. In using the device, when the height of the level indicator plate 38 is set, as hereinbelow described, for the addition of a quantity of standard paint, the particular paint is poured in the can C until its level is between the lower ends of the two marks 39 (see Fig. 3).

The level indicator rod 30 is adapted to be moved up and down in accordance with the position of the outer end of a lever member 40, hereinbelow to be described. To this end the sleeve member 27 has clamped thereto, as by a screw 41, a horizontal push member 42 having a pair of laterally extending parallel pins 43. The pins 43 each have journalled at their outer end a roller 44 bearing against either longitudinal edge of the vertical support bar 15, whereby the sleeve member is positively constrained to vertical movement (see Fig. 16).

The lever member 40 comprises a pair of parallel, spaced-apart members 45 and 46 held in spaced-apart relation by left and right spacer blocks 47 and 48 respectively (see Fig. 11). The right-hand end (see Fig. 3) of the spaced-apart member 45 has an extension arm 49 terminating in a roller 50 journalled thereon and bearing against the underside of the push member 42. The left-hand ends of the lever members 45 and 46 have pivoted between them an internally-threaded follower member 51 threaded on a screw rod 52 for vertical movement therealong as hereinbelow more fully described.

A movable central fulcrum axis is provided for the lever member 40, the same comprising a rear rectangular guide plate 53 fixed against the vertical supporting plate 13 and a front rectangular guide plate 54 spaced from said rear plate by a spacer block 55 fixed to the vertical supporting plate 13. The front guide plate 54 is fixed to the spacer block 55 as by screws 56. Slidable along the top edges of the front and rear supporting plates 53 and 54 are a pair of slide blocks 57, 58 having central transverse aligned openings between which is journalled a shaft mechanism 59 serving as the fulcrum axis of the lever member 40. The shaft mechanism 59 comprises a shaft 60 having its inner end journalled in the rear slide block 57 and its outer end fitted with a sleeve 61 journalled in the front slide block 58. Between the slide blocks 57 and 58 the shaft carries an inverted T-shaped elongated carriage member 62 providing spaced parallel shoulders 63, 64 adapted to slide along the lower edges of the lever members 45 and 46 respectively. Preferably, the sliding surfaces of the carriage member 62 are lined with brass liner members 65, 66.

The carriage member 62 is provided with a central opening 67 within which a gear 68 is disposed, said gear being fixed to the shaft 60 as by set screw 69. Cooperative with the gear 68 at the underside thereof is an elongated rack 70 having one end pivotally secured to spacer block 47 as by pin 71 (see Figs. 3 and 11) and the other end resiliently supported by the underside of spacer block 48 as by coil spring 72 wound on a transverse pin 73 in said latter spacer block. It will thus be evident that the elongated rack 70 is held securely against the peripheral teeth of the gear 68 so that when the gear is turned, the carriage 62, together with the whole shaft mechanism 59 will be moved to one side or the other, thereby shifting the fulcrum axis of the lever member 40. The sleeve 61 is fixed with respect to the carriage member 62 and has fixed thereto at its outer end a pointer 74 cooperative with a disk-like dial 75, said dial being fixed to the shaft 60 for rotation therewith. A manually operable knob 76 is fixed as by set screw 77 to the extreme end of the shaft 60 whereby said shaft can be turned to move carriage 62 back and forth to change the fulcrum axis of the lever member 40. Inscribed in the dial 75 are indicator markings designating for instance, 4 oz., pt., qt., ½ gal., and gal. can sizes at corresponding positions of the lever fulcrum as indicated by the indicator 74 (see Fig. 1).

The vertical screw rod 52 is journalled in upper and lower journal blocks 78, 79 respectively, said blocks being fixed against a vertical plate 80 secured against the inside of vertical supporting plate 13 as by screws 81 (see Fig. 2). The lower end of this screw rod 52 has fixed thereto a bevel gear 82. The bevel gear 82 is cooperatively engaged with a second bevel gear 83 fixed upon control shaft 84 as by set screw 85. The control shaft 84 is journalled at its inner end in a bushing 86 fitted within the vertical plate 80 and at its outer end in a bushing 87 fixed within a right angular support bracket 88 secured to the base 11 as by screws 88a (only one shown). The control shaft 84 is furthermore journalled at an intermediate position within an opening in a vertical support plate 89 fixed between the lower journal block 79 and a bottom support block 90 as by machine screws 91. A manually operable handle 92 is fixed to the outer end of the control shaft 84 whereby, upon turning said handle, the screw rod 52 will be turned to move the follower member 51 and consequently the left-hand end of the lever member 41 up and down.

Indicator means associated with the shaft 84 are provided for determining the position of the lever member 41 in accordance with proportion formulae, the same comprising a units indicator wheel 93 and a wheel 94 having subdivisions from 1 to 20. The units indicator wheel 93 is fixed to the shaft 84 to rotate therewith. The wheel 94 is interconnected with the shaft 84 by transfer mechanism to advance on subdivision each time the shaft 84 is rotated one complete revolution. Said transfer mechanism comprises a transfer gear 95 fixed to shaft 84 and having a pair of teeth 96 cooperative with an offset pinion gear 97 journalled in the vertical support plate 89 to turn said gear by a discrete amount each time the shaft 84 is fully rotated. The pinion gear 97 has a gear portion 98 of reduced diameter cooperative with a gear 99 fixed on a bushing member 100 rotatable about shaft 84. Also fixed to bushing member 100 is the wheel 94 having subdivisions from 1 to 20. The gear ratios in the transfer mechanism just described are such that when the handle 92 is rotated one full revolution, the wheel 94 will advance by one subdivision. The threads on the screw rod 52 are such that as the handle 92 is turned in the clockwise direction (Figs. 1, 9) from 0 to 200, the follower will move from its uppermost position to its lowermost position; and the level indicator rod 30 will conversely be moved from its lowermost position to its highest position depending upon the setting of the dial 75 for the size of can C to be filled.

Mechanism is provided to limit movement of the handle 92 below zero value and above the maximum value of 200 in order to prevent harmful jamming at the end journals of screw rod 52. Said mechanism comprises a vertical push rod 101 extending through slots in journal block 78, follower 51 and journal block 79, and terminating (see Fig. 14) in an off-set portion 102 having its end pivotally connected to a yoke member 103 pivoted about a screw 104 fixed to the vertical plate 80. The yoke member 103 is spaced from the plate 80 by a spacer 105 (Fig. 2) and has its lower end connected by a tension coil spring 106 to base 11 through a rectangular opening in the bottom support block 90. The yoke member 103 has upwardly extending arcuate arms 107 and 108 normally in concentric disposition with respect to the axis of shaft 84 (see Fig. 14) but adapted to be moved to one side or the other against the neutralizing action of spring 106. The shaft 84 has fixed with respect thereto and surrounding it a bushing 109 having a radially extending pin adapted to strike one or the other of the arcuate arms 107, 108, when the yoke member 103 is moved one way or the other from neutral position due to movement of the push rod 101. The push rod 101 has upper and lower horizontally extending pins 111, 112 respectively, so positioned as to be abutted and pushed by the follower member 51 when it just exceeds its upper and lower limits (see Figs. 12, 14). It will thus be apparent that once the push rod 101 has been actuated at either end by the limiting positions of the follower member 51, corresponding to positions slightly below zero, further rotation of the indicating shaft 84 will be prevented.

The sides and top of the measuring device are preferably covered, in any convenient manner, by a top panel 113, a side panel 114, and end panels 115 and 116 (see Figs. 2, 3 and 4), all held together by brackets and sheet metal screws. The indicator gear mechanism is enclosed by an appropriate box-like cover 117 fitted with a glass window 118 for viewing the indicator wheels 93 and 94.

In using the device, the indicator rod 30 will first be shifted by knob 32 to allow placement of the can C (see Fig. 1). The knob 76 will next be turned to indicate on dial 75 by pointer 74 the size of the can being used, i. e. the quantity of paint desired. The handle 92 will then be turned so that the indicator dials 93 and 94 read zero as viewed through the window 118. The thumb screw 31 will then be turned to bring the level indicator plate 38 to the level of a small amount of thinner first poured in the can C as indicated by the level reaching between the marks 39 of said plate. The handle 92 will then be turned to the first number according to the predetermined paint formula and the corresponding basic color paint is added until the level reaches between the measuring marks on the level indicator plate 38. Successive readings and additions of basic color paints are made according to the particular predetermined formula used until the 200 mark is reached, at which point the can will be full of the various basic color paints in correct proportions to provide the exact color required.

It will thus be seen that there is provided a device in which the several objects of this invention are achieved, and which is well adapted to meet the conditions of practical use.

As various possible embodiments might be made of this invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In a measuring machine for liquids, the combination comprising a lever member having a fulcrum intermediate its ends, measuring means for indicating height of a liquid, said measuring means being operatively connected with one end of said lever to be vertically moved thereby when said lever member moves about said fulcrum, manually operable means connected with the other end of said lever to vary the position of said lever, limit mechanism to prevent operation of said lever position varying means beyond predetermined upper and lower limits, said limit mechanism being constructed so as to prevent jamming of the mechanism, and manually operable means to vary the position of said intermediate fulcrum with respect to the ends of said lever.

2. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down, limiting abutment means operative to prevent further actuation of said manually operable means when operated beyond either one of said abutment means limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means.

3. In a measuring device for liquids the combination comprising a lever having a central fulcrum, a vertical screw rod, a follower threaded on said screw rod and pivoted to one end of said lever, a manually rotatable adjustment shaft, gear means interconnecting said screw rod and said shaft for cooperative motion, handle means on said shaft for turning said screw to move said one end of said lever up and down between two limits, means controlled by said follower and operative to prevent further turning of said handle means when said lever is moved beyond either one of said two limits, manually operable means to vary the position of said intermediate fulcrum with respect to the ends of said lever, and a vertical measuring rod for indicating height cooperatively connected with the other end of said lever to be moved in dependence upon the positions of said manually operable turning means and said manually operable fulcrum position varying means.

4. In a measuring device, for fluids, a lever having a central fulcrum, a vertical screw rod, a follower member threaded on said screw rod and pivoted to one end of said lever, a manually rotatable adjustment shaft, gear means interconnecting said screw rod and said shaft for cooperative motion, handle means on said shaft for turning said screw to move said one end of said lever up and down between two limits, a radial abutment member on said shaft, abutment means engageable with said abutment member and means adapted to be contacted by said follower member and move said abutment means into engagement with said abutment member to prevent further turning of said handle means when said lever is moved beyond either one of said two limits, and a vertical measuring rod for indicating height cooperatively connected with the other end of said lever to be moved in dependence upon the position of said manually operable turning means.

5. The invention as defined in claim 4, wherein said abutment means comprises a yoke member aligned with said radial abutment member on said shaft, resilient means normally holding said yoke at neutral position, and rod means pivoted to said yoke member and cooperative with said follower member to be moved when said lever is moved beyond either one of said two limits to move said yoke member out of neutral position into abuttable position with respect to said radial abutment member.

6. The invention as defined in claim 5, wherein said rod means comprises a vertical rod extending along said screw rod, and horizontal abutment pins extending horizontally from said vertical rod and adapted to be abuttingly engaged by said follower member.

7. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, and calibrated means associated with said manually operable turning means to indicate the position of said one end of said lever between said two limits, abutment means operative to prevent further actuation of said manually operable means when operated beyond either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means.

8. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, means associated with said manually operable turning means and including transfer gear mechanism to indicate calibrated positions of said one end of said lever between 0 and 200, said indications constituting said two limits, abutment means operative to prevent further actuation of said manually operable means when operated to either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means.

9. In a measuring device for liquids the combination comprising a lever having a central fulcrum, a vertical screw rod, a follower threaded on said screw rod and pivoted to one end of said lever, a manually rotatable adjustment shaft, gear means interconnecting said screw rod and said shaft for cooperative motion, handle means on said shaft for turning said screw to move said one end of said lever up and down between two limits, abutment means engageable with said shaft and operative to prevent further turning of said handle means when said lever is moved beyond either one of said two limits, manually operable means to vary the position of said intermediate fulcrum with respect to the ends of said lever, said fulcrum position varying means comprising a carriage member slidable within a longitudinal opening in said lever, a transverse fulcrum shaft journalled in said carriage member and means to slide said carriage member along said longitudinal opening, and a vertical measuring rod for indicating height cooperatively connected with the other end of said lever to be moved in dependence upon the positions of said manually operable turning means and said manually operable fulcrum position varying means.

10. In a measuring device for liquids the combination comprising a lever having a central fulcrum, a vertical screw rod, a follower threaded on said screw rod and pivoted to one end of said lever, a manually rotatable adjustment shaft, gear means interconnecting said screw rod and said shaft for cooperative motion, handle means on said shaft for turning said screw to move said one end of said lever up and down between two limits, abutment means engageable with said shaft and operative to prevent further turning of said handle means when said lever is moved beyond either one of said two limits, manually operable means to vary the position of said intermediate fulcrum with respect to the ends of said lever, said fulcrum position varying means comprising a carriage member slidable within a longitudinal opening in said lever, a transverse fulcrum shaft journalled in said carriage member, a gear fixed on said fulcrum shaft and a rack secured to said lever and meshed with said gear, and a vertical measuring rod for indicating height cooperatively connected with the other end of said lever to be moved in dependence upon the positions of said manually operable turning means and said manually operable fulcrum position varying means.

11. The invention as defined in claim 10 in combination with resilient means to hold said rack against said gear.

12. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, abutment means operative to prevent further actuation of said manually operable means when operated beyond either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means, said measuring rod means comprising a vertical rod, a vertical guide member fixed adjacent the other end of said lever, a sleeve member slidable on said guide member, means interacting between said sleeve and said other end of said lever to move said sleeve when said lever is moved, and an arm fixed to said sleeve member and operative to control the vertical position of said vertical measuring rod.

13. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, abutment means operative to prevent further actuation of said manually operable means when operated beyond either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means, said measuring rod means comprising a vertical rod, a vertical guide member fixed adjacent the other end of said lever, a sleeve member slidable on said guide member, track and roller means interacting between said sleeve and said other end of said lever to move said sleeve when said lever is moved, and an arm fixed to said sleeve member and operative to control the vertical position of said vertical measuring rod.

14. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, abutment means operative to prevent further actuation of said manually operable means when operated beyond either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means, said measuring rod means comprising a vertical rod, a vertical guide member fixed adjacent the other end of said lever, a sleeve member slidable on said guide member, means interacting between said sleeve and said other end of said lever to move said sleeve when said lever is moved, and an arm fixed to said sleeve member, said arm having an opening, said vertical rod being disposed in said opening, said rod being threaded and having an abutment screw threaded thereon and in engagement with said arm.

15. In a measuring machine for liquids, the combination comprising a lever member having a fulcrum intermediate its ends, a vertical screw, a follower threaded on said screw and pivoted to one end of said lever, manually operable means to turn said screw to move said one end of said lever up and down between two limits, abutment means operative to prevent further actuation of said manually operable means when operated beyond either one of said two limits, manually operable means to vary the position of said intermediate fulcrum with respect to the ends of said lever, and a vertical measuring rod means for indicating height of liquid cooperatively connected with the other end of said lever to be vertically moved in dependence upon the positions of said manually operable turning means and said manually operable fulcrum position varying means, said measuring rod means comprising a vertical rod, a vertical guide member fixed adjacent the other end of said lever, a sleeve member slidable on said guide member, track and roller means interacting between said sleeve and said other end of said lever to move said sleeve when said lever is moved, and an arm fixed to said sleeve member, said arm having an opening, said vertical rod being disposed in said opening, said rod being threaded and having an abutment screw threaded thereon and in engagement with said arm.

16. The invention as defined in claim 15, including auxiliary guide means for said vertical rod.

17. The invention as defined in claim 15, including auxiliary guide means for said vertical rod and resilient friction means associated with said auxiliary guide means to minimize looseness of said vertical rod.

References Cited in the file of this patent

UNITED STATES PATENTS

| | | |
|---|---|---|
| 2,354,259 | Grubelic | July 25, 1944 |
| 2,561,525 | McCauley | July 24, 1951 |
| 2,563,601 | Grubelic | Aug. 7, 1951 |
| 2,685,135 | Grubelic | Aug. 3, 1954 |